LIMITER FOR PULSE AMPLIFIERS

Filed Jan. 10, 1952 3 Sheets-Sheet 1

INVENTOR
SAMUEL LUBKIN
BY
Davis, Hoxie, Faithfull
ATTORNEYS

Aug. 7, 1956 S. LUBKIN 2,758,205

LIMITER FOR PULSE AMPLIFIERS

Filed Jan. 10, 1952 3 Sheets-Sheet 2

INVENTOR
SAMUEL LUBKIN
BY
Davis, Hoxie & Faithfull
ATTORNEY

Aug. 7, 1956 S. LUBKIN 2,758,205

LIMITER FOR PULSE AMPLIFIERS

Filed Jan. 10, 1952 3 Sheets-Sheet 3

INVENTOR
SAMUEL LUBKIN
BY
Davis, Hoxie & Faithfull
ATTORNEY

United States Patent Office 2,758,205

Patented Aug. 7, 1956

2,758,205

LIMITER FOR PULSE AMPLIFIERS

Samuel Lubkin, Brooklyn, N. Y., assignor, by mesne assignments, to Underwood Corporation, New York, N. Y., a corporation of Delaware Application January 10, 1952, Serial No. 265,738

16 Claims. (Cl. 250—27)

This invention relates to an improved limiter for regulating the output of a pulse amplifier.

One of the difficulties encountered in the design of pulse amplifiers for computing circuits and similar equipment, is the problem of securing uniform output. Aging of tubes, variations in the characteristics of new tubes due to manufacturing tolerances, etc., and, to a lesser degree, variations of a similar nature in other circuit parameters, make it necessary to design the amplifier to give adequate output under the worst combination of circumstances anticipated in practice. As a result of this, the amplifier output signals, even under optimum operating conditions, are excessively large, resulting in overloading of components, particularly crystal diodes; in some instances the output currents are high enough to cause overloading of resistors. Furthermore, in these circuits, power consumption is high and efficiency correspondingly low.

In the past various measures have been suggested to solve these problems. The prior art for example has proposed that cathode degeneration be utilized, but this system, as is well known, results in a sacrifice of gain and efficiency.

I have invented an improved limiting system which does not require additional driving signal amplitude, while at the same time it permits the circuit to operate at maximum efficiency under widely varying conditions. In accordance with my invention, a limiter for pulse amplifiers is disclosed. An amplifier having an input end and an output end is provided, signal means being arranged for supplying pulse signals to the input end. Coupling means are connected in circuit relation with the output end of the amplifier, the coupling means including output terminals for supplying a load. A feedback path is connected from the coupling means to the input end; the feedback path includes at least one normally non-conducting diode rectifier having a positive terminal and a negative terminal, and a source of positive potential of predetermined magnitude. The positive potential source is arranged in the feedback path, where it supplies electrical potential of said predetermined magnitude to the negative terminal of the diode rectifier. In this manner the feedback path supplies a differential potential to the negative terminal of the diode in response to variations in pulse amplitudes appearing in said output end. When the feedback signal exceeds the predetermined magnitude of the positive potential source, the diode conducts, causing a reduction in the pulse signal to the input end, so that the potential on the output end of the amplifier remains substantially constant under all operating conditions.

Figure 1:
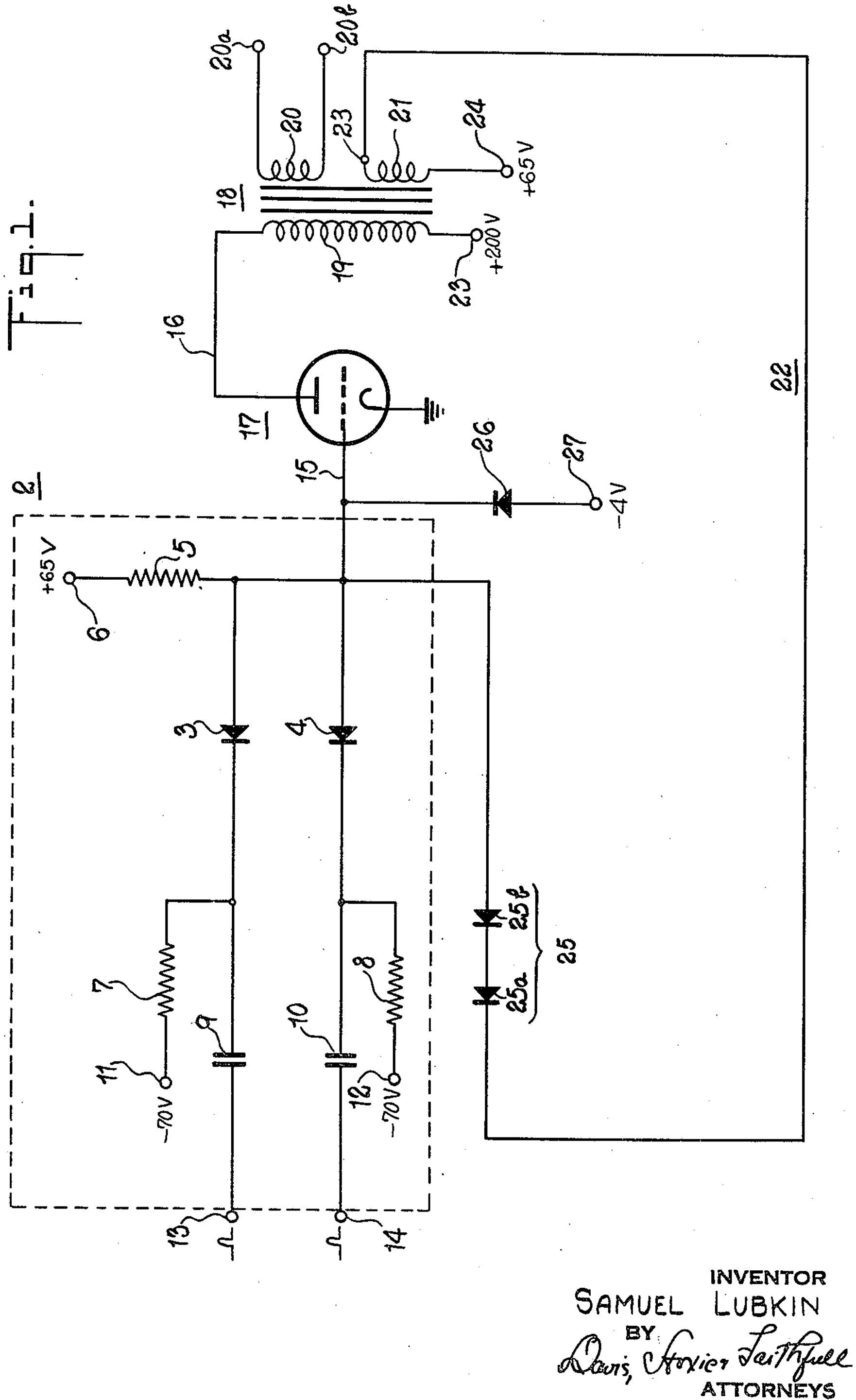
Figure 2:
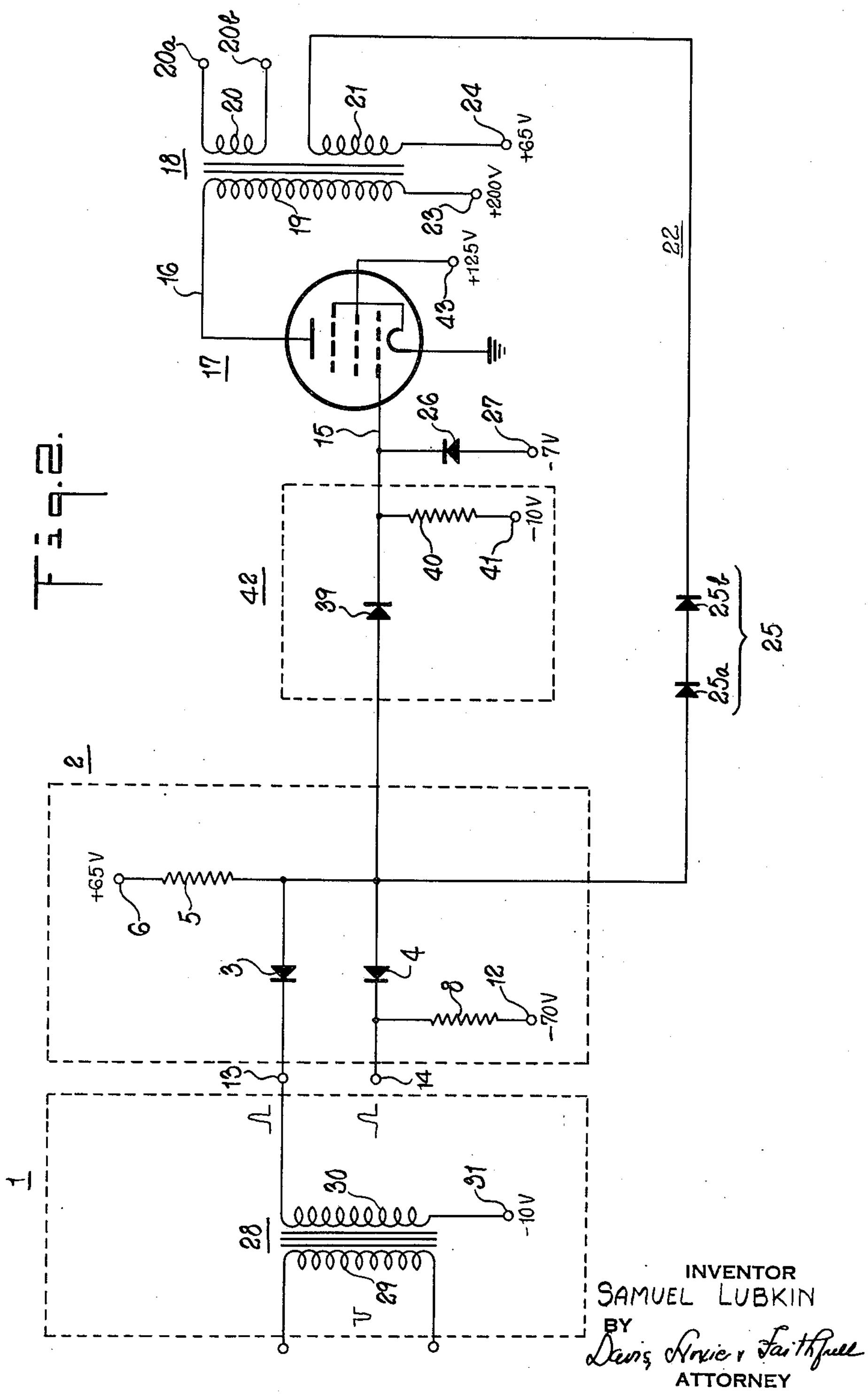
Figure 3:
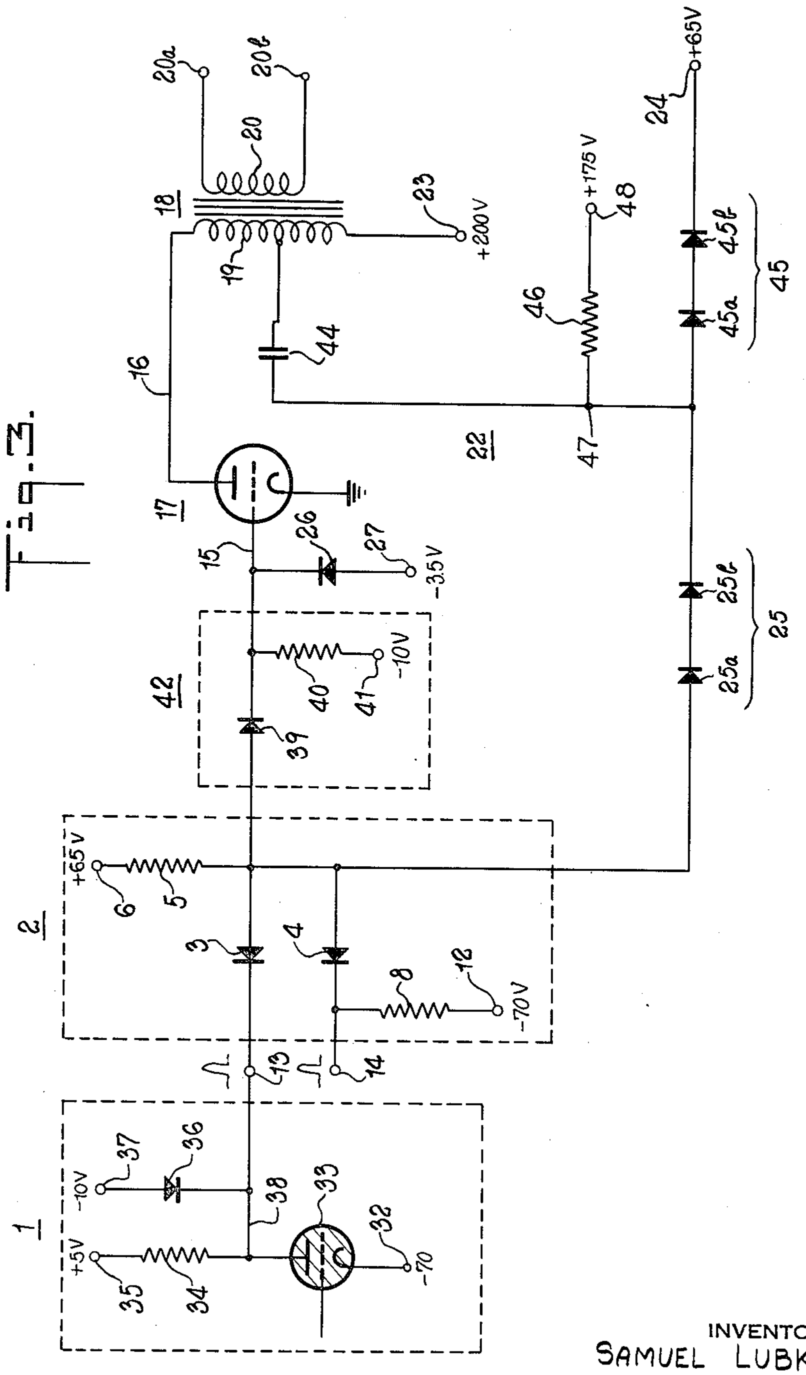

A better understanding of the invention will be had from the following detailed description taken in connection with the accompanying drawing, in which Fig. 1 is a circuit diagram of the limiter for pulse amplifiers in accordance with my invention, and Figs. 2 and 3 are circuit diagrams respectively illustrating other embodiments of the device in accordance with my invention.

In the description to follow, the same numerals are used to designate those elements or circuit components which are possessed in common by the circuits of Figs. 1, 2 and 3.

Referring now to Fig. 1 of the accompanying drawings, a diode gating circuit is shown generally at 2; this circuit comprises a pair of germanium crystal diodes 3 and 4, a resistance 5, a source of positive potential 6, a pair of resistances 7 and 8, a pair of capacitors 9 and 10, and sources of negative potential 11 and 12. The input pulse signals are applied by any suitable means (not shown in Fig. 1) to the diode gating circuit at input signal receptors 13 and 14.

The negative terminal of diode 3 is connected to the parallel combination of resistance 7 and capacitor 9; the other side of resistance 7 is connected in series with the source of negative potential 11, and the other side of capacitor 9 is connected in series with input signal receptor 13. In a similar manner, the negative terminal of diode 4 is connected to resistance 8 and capacitor 10 which are in parallel, resistance 8 being in series with negative potential source 12, and capacitor 10 being in series with input signal receptor 14. An amplifier having an input end 15 and an output end 16 is indicated generally at 17. The positive terminals of diodes 3 and 4 are connected to the input end 15 of the amplifier. Potential source 6, having resistance 5 in series therewith, is also connected to input end 15.

For purposes of illustration, the amplifier 17 has been shown as a vacuum tube amplifier of the triode type. It should be understood of course that amplification can be obtained from any suitable multi-element thermionic vacuum tube, a transistor or a magnetic amplifier. The input end 15 is connected to the control grid of triodes 17, the triode output being taken from the plate which is connected to the output end 16.

A coupling means shown generally at 18 is connected in circuit relation with the output end 16. In the embodiment disclosed in Fig. 1, the coupling means is a pulse transformer having a primary winding 19 and at least two secondary windings 20 and 21. The output end 16 of triode 17 is connected to the primary winding 19. The one secondary winding 20 has output terminals 20*a* and 20*b* for supplying the amplifier pulse signal to whatever load is desired. The other secondary winding 21 is included in the feedback path indicated generally at 22.

In contemplation of my invention the feedback path 22 is connected from the coupling means 18 to the input end 15. In this embodiment (Fig. 1) I have shown a pair of germanium crystal diodes 25*a*, 25*b* connected in series and arranged in the feedback path. The purpose of using a pair of diodes rather than a single diode, is to prevent excessive back voltage across a single diode; this consideration in turn has been dictated by the operational limitations imposed by commercially available crystal diodes. Specially designed crystal diodes having a higher rating can of course be constructed, and hence, it will thus be appreciated that a single diode 25 can be used in the feedback path in lieu of the pair (25*a*, 25*b*) illustrated in Fig. 1.

As will be seen in Fig. 1, the positive terminal of diode 25*b* is connected to the input end 15, while its negative terminal is connected to the positive terminal of diode 25*a*. The negative terminal of diode 25*a* is connected to one end of secondary 21 of the pulse transformer 18. The other end of secondary 21 is connected to a source of positive potential 24 of predetermined magnitude. The criteria used in determining the magnitude of source 24 will be evident as the discussion proceeds.

The circuit for triode 17 is well known in the art. The cathode is maintained at ground potential, and plate potential is provided by positive potential source 23 supplied through the primary of transformer 18.

In addition to the above described circuit components, a germanium crystal clamping diode 26 may be utilized to advantage as will be explained later. It should be understood that the clamping diode 26 is not an essential circuit component in the practice of my invention. In those situations where a clamping diode is employed, the negative terminal thereof is connected to input end 15, and its positive terminal is connected to a source of negative potential 27.

In order to simplify the explanation of the invention all potential sources have been indicated on the drawing by their individual magnitudes and polarities; these magnitudes and polarities are not critical and the invention is not so limited, the particular values given being by way of illustration only.

Initially, let us consider the operation of the limiter system shown in Fig. 1 with clamping diode 26 removed. The circuit indicated generally at 2 is known in the art as an "and" gate. This circuit is so named because the gating action is effected upon the simultaneous receipt of signal pulses at both inputs. In the arrangement of Fig. 1, circuit 2 is responsive to positive signals received simultaneously at input signal receptors 12 and 13.

The negative ends of diodes 3 and 4 are supplied with negative potential from sources 11 and 12 respectively, while the positive end of said diodes are connected to a source of positive potential 6, such that said diodes in their normal state draw current through resistance 5. Hence, the input end 15 (and hence the control grid of tube 17) connected to the positive end of diodes 3 and 4 is at a potential sufficiently negative (normally at about 4 v.) to bias tube 17 beyond cutoff. At the same time, the negative terminal of diode 25 is at approximately +65 v. (because it is connected to positive potential source 24), and the positive terminal is at the same potential as the grid or input end 15, which in this case is the potential of —4 v. Since its negative end is more positive than its positive end, diode 25 will not conduct, and hence it does not affect the gating circuit 2—tube 17 remains non-conducting.

When positive input signals are applied to diodes 3 and 4 via receptors 13 and 14, the bias on the grid of tube 17 goes slightly positive so that tube 17 conducts. In one embodiment which was used, the input signal amplitude was of the order of 45 volts. The conductance of tube 17 causes a signal to appear in secondaries 20 and 21. Feedback path 22 is so designed that the signal appearing in secondary 21 opposes the potential of source 24. Assuming the potential at terminal 23 is $e$ and the potential of the source at terminal 24 is $e_2$, then the potential applied to the negative end of diode 25 is $$e_1=-(e-e_2)$$

Two examples will be given to illustrate the manner in which the limiting action is obtained.

Let the input pulse signals applied to the receptors 13 and 14 be of a magnitude of +1 v. This will cause diodes 3 and 4 to become non-conducting, whereupon the input end 15 of tube 17 rises to a potential of approximately 1 v. causing tube 17 to become conducting. This, in turn, will induce a potential of approximately +63 v. at the terminal 23 of the pulse transformer 18. Hence, the potential applied to the negative terminal of diode 25 will be $$e_1=-(63\text{ v.}-65\text{ v.})=+2\text{ v.}$$

Since the positive terminal of diode 25 is connected to the input end 15 which is at a potential of approximately +1 v., diode 25 will not conduct and therefore will not affect the gating circuit 2.

Now, let it be assumed that the input pulse signals applied to the receptors 13 and 14 be of a magnitude of +2 v. This will cause diodes 3 and 4 to become non-conducting, whereupon the input end 15 of tube 17 rises to a potential of approximately 2 v. causing tube 17 to become conducting. This, in turn, will induce a potential of approximately +68 v. at the terminal 23 of the pulse transformer 18. Hence the potential applied to the negative terminal of diode 25 will be $$e_1=-(68\text{ v.}-65\text{ v.})=-3\text{ v.}$$

Since the positive terminal of diode 25 is connected to the input end 15 which is at a potential of approximately +2 v., diode 25 will now conduct. Diode 25 in conducting will change the potential on the input end 15, in such direction, as to reduce the amplitude of the signal appearing in the plate circuit of tube 17. If the number of turns on the feed-back secondary 21 is made large, the limiting action will be quite sharp, once the signal exceeds the magnitude as determined by source 24. Since the limiting action affects the output of tube 17 by changing the bias on the control electrode, it will also affect the output signal in secondary 21 in the same direction.

If the triode 17 is kept in its non-conducting state for relatively long time intervals a condition may result in which there will be a time delay between the application of a signal to the tube, and the appearance of the resultant amplified signal on the output end of the tube. While this time lag is of the order of microseconds, it is quite a serious problem in the design of highly complex electronic computer circuits. The theories advanced in explanation of this phenomenon need not concern us here since it forms no part of this invention. In order to avoid this condition of delayed action, it is preferable to make tube 17 slightly conducting at all times. To accomplish this I employ clamping diode 26 to limit the amount of negative bias that is applied to the grid of the triode. Since the positive end of diode 26 is connected to negative potential source 27 (—4 v.), the grid potential is negatively limited to —4 v. In other words, if without the clamper diode 26, diode 25 would conduct and lower the grid potential to say —5 v., with the clamper diode in circuit as shown, the grid potential is limited or clamped at —4 v., and therefore tube 17 conducts slightly at all times.

In some applications of my invention a gate circuit having two input circuits is not required in that one input circuit of gate 2 and the feedback path from diode 25 form a separate gate circuit in themselves for controlling the bias of tube 17. In these latter applications diode 4, together with the components associated with it—resisttance 8, capacitor 10 etc.—may be eliminated. The input signal may then be applied, through the single diode 3 or through any other suitable circuitry to the input end 15 of the amplifier 17.

That value of positive potential source 24 is chosen so that under the least favorable circumstances, a signal of full desired amplitude can just be produced. In accordance with the limiting principles taught, under conditions of maximum tube emission and gain, the amplitude of the output signal appearing at secondary winding 21 will increase beyond that minimum value by an insignificant amount.

In the embodiments shown in Figs. 2 and 3, there is illustrated respectively two suitable signal means for supplying the input signals to the circuit. These signal means of course form no part of my invention, but are included here in the interests of completeness of disclosure.

In the modification shown in Fig. 2, the signal means are indicated generally at 1. This signal means comprises a pulse transformer 28 having a primary 29 and a secondary 30. One end of the secondary 30 is connected to input signal receptor 13 and the other end is connected to a source of negative potential 31, the purpose of source 31 being to supply negative potential to the negative terminal of diode 3.

In the modification shown in Fig. 3 the signal is provided from an amplifier triode 33 which is normally conducting. The plate of tube 33 is supplied with positive potential by means of a source of potential 35 in series with a resistor 34. The cathode is maintained at the proper negative potential by negative source 32. The plate or output 38 of the tube is connected to signal receptor 13. A clamper diode 36 has its negative terminal connected to output line 38, and its positive terminal connected to a source of negative potential 37; the purpose of clamper diode 36 is to keep the lower end of the swing constant as the driver tube ages.

The gating circuits employed in the embodiments of Figs. 2 and 3 are identical. The positive terminal of diode 3 is connected to positive potential source 6 through resistance 5, and the negative terminal is connected to input signal receptor 13. Diode 4 has its positive terminal connected to positive source 6 through resistance 5, and its negative terminal connected to negative source 12 through resistance 8. As previously explained in connection with the circuit arrangement of Fig. 1, the gating circuit in both embodiments (Figs. 2 and 3) functions as an "and" gate.

In Fig. 2 and Fig. 3 a clipping circuit is shown generally at 42. This circuit comprises a germanium crystal diode 39, a resistance 40 and a source of negative potential 41. As will be seen from a study of the respective circuit diagrams, the positive terminal of diode 39 is more negative than its negative terminal so that diode 39 is normally non-conducting. For example in the Fig. 3 arrangement the positive terminal of diode 39 is at —10 v., while the negative terminal is at —3.5 v. There is thus established a noise level of some 6.5 v.; this level must be exceeded before the diode will conduct, so that spurious pulses below this magnitude will have no effect on the input 15.

The amplifier 17 shown in Fig. 2 is well known in the art; this amplifier comprises a pentode driven as a tetrode, screen potential being supplied by positive potential source 43.

In Fig. 3 I employ a slightly different arrangement for the feedback line 22. The feedback signal is fed back through a capacitor 44 connected on one side to a tap on the primary of transformer 18, and on the other side to the negative terminal of diode 25. A load resistor 46 is connected at one end to a source of positive potential 47 and at the other end to the negative terminal of diode 25. Source 24 is connected to point 47 through two diodes **45*a* and 45*b* connected in series as shown in the drawing. As previously explained in connection with diode 25, two diodes 45*a* and 45*b*** are here used in place of a single crystal diode so that an excessive back voltage does not develop across one of them.

The circuit in Fig. 3 is similar in operation to the modifications of Figs. 1 and 2. Assume an amplified signal on output end 16 of —100 v.; at the tap on primary 19 the potential will be about —66 v. This will tend to drive point 47 (and hence the negative terminal of diode 25) down to —1 v., so that diode 25 will conduct and cause a reduction in the pulse signal to the input end.

Although crystal diodes have been used in the illustrative embodiments of my invention, thermionic diodes could also be used. The advantages of crystal diodes are their relatively small size, reasonably long life (since there is no cathode disintegration), and little shunt capacity. In addition there is no socket to take up valuable space, and no heater power is required as in the case of the thermionic diode.

It will be readily apparent to those skilled in the art that the basic principles of my invention can be utilized with various circuit arrangements. In the illustrative circuit disclosed herein, I have shown the coupling means as a pulse transformer, but any suitable coupling network could be employed with equal facility. The term "coupling means" as used herein and in the accompanying claims, is therefore intended to include any suitable coupling network for supplying the requisite feedback signal in accordance with the principles of this invention.

Further, the term "amplifier" as used herein and in the accompanying claims, is intended to include a single stage or a plurality of stages connected in cascade.

Various other modifications may be made in my invention without departing from the spirit and scope thereof. The only limitations which are intended are those necessitated by the prior art or expressly indicated in the accompanying claims.

I claim:

1. A limiter comprising in combination, an amplifier having an input end and an output end, gating means having a plurality of inputs, said gating means being responsive to pass the lowest amplitude input signal to said input end, coupling means in circuit relation with said output end, the coupling means including output terminals for supplying a load, gating means, a feedback path from said coupling means to the said gating means, said gating means including at least one normally non-conducting diode having an anode and a cathode, and a source of positive potential of predetermined magnitude arranged in said path, said positive source supplying electrical potential of said predetermined magnitude to the cathode of said diode, said feedback path feeding back a differential potential to said cathode of the diode in response to variations in pulse amplitudes appearing in said output end, whereby when said pulse amplitudes exceed the predetermined magnitude of said positive potential source, the diode conducts and causes a reduction in the pulse signal to said input end.

2. A limiter according to claim 1 in which said amplifier is an electron tube, said electron tube having an anode, a cathode and at least one control electrode, the control electrode being connected to the input end, and the anode being conneced to the output end.

3. A limiter according to claim 1 in which said gating means comprises second and third diodes, each of said latter diodes having an anode and a cathode, the anodes of said second and third diodes being connected to the input end, a pair of resistances and a pair of capacitors, each of the cathodes of said second and third diodes being connected respectively to the parallel combination of one of said resistances with one of said capacitors, two sources of negative potential, each resistance being in series with one of the sources of negative potential, a pair of input signal receptors, each capacitor being in series with one of the input signal receptors, and a second source of positive potential and a third resistance connected to said input and, whereupon the simultaneous occurrence of positive pulses at both of said input signal receptors results in the application of the input pulse signal to said input end of the amplifier.

4. A limiter according to claim 1 in which said gating means comprises second and third diodes, a second source of positive potential and a source of negative potential, each of said latter diodes having an anode and a cathode, the anodes of said second and third diodes being connected to the input end, a pair of resistances, the second source of positive potential being connected through one of said resistances to the anodes of said latter diodes, the source of negative potential being connected through the other of said resistances to the cathode of said third diode, a pair of input signal receptors connected to the cathodes of said second and third diodes respectively, whereupon the simultaneous occurrence of positive pulses at both of said input signal receptors results in the application of the input pulse signal to said input end of the amplifier.

5. A limiter according to claim 1 wherein said coupling means comprises a pulse transformer having a primary winding and at least two secondary windings, said primary windings being connected to said output end, one of said secondary windings being connected to the said output terminals for the load, the feedback path including the other of said secondary windings, one end of said latter secondary winding being connected to the cathode of the double rectifier, the other end of said latter secondary being connected to the said positive potential source.

6. A limiter according to claim 1 wherein the coupling means comprises a pulse transformer having a primary winding and a secondary winding, the primary winding being connected to said output end, said secondary winding being connected to the said output terminals for the load, the feedback path including a capacitor, one side of said capacitor being connected to a tap on the said primary winding, the other side of the capacitor being connected to the cathode of said diode rectifier, and a load resistor connected at one end to a second source of positive potential, the other end of said load resistor being connected to the cathode of said diode rectifier.

7. A limiter according to claim 1 in which a clipping circuit is interposed between the gating means and said input end, said clipping circuit comprising a second diode rectifier having an anode and a cathode, and a source of negative potential, said negative potential source being connected to the cathode of said latter diode, the positive terminal thereof being connected to said gating means.

8. A limiter including in combination, an amplifier with input and output ends, a signal means for applying pulse signals to said input end, a clipping circuit interposed between the signal means and the input end, a pulse transformer having primary and secondary windings, the primary of said transformer being coupled to the output end of said amplifier, the secondary winding being connected to a load, gating means, said gating means including at least one diode having an anode and a cathode, a load resistor, first and second sources of positive potential, and a coupling condenser, the first source of positive potential being of predetermined magnitude and being connected to the anode of said diode, the resistor being connected at one end to said cathode of said diode, the other end of said resistor being connected to said second source of positive potential, said coupling condenser being connected on one side to a tap on the primary winding of said pulse transformer, the other side being connected to the cathode of said diode.

9. A limiter according to claim 8 wherein the clipping circuit comprises a second diode having an anode and a cathode, and a source of negative potential, the anode of said second diode being connected by said gating means to said signal means; the cathode being connected to said source of negative potential.

10. A limiter for pulse amplifiers comprising, a source of pulse signals, a gating circuit having a plurality of inputs, an amplifier having an input end and an output end, said gating circuit responsive to pass the lowest amplitude input pulse signal to said input end, a reference voltage source, coupling means connected to the output end of said amplifier and to said reference voltage source and responsive thereto for producing a differential potential, a feedback path including at least one unilateral conducting means having an anode and a cathode and being responsive at said cathode to said differential potential for applying a potential via said anode to said gating circuit, said gating circuit operating to limit the output of said amplifier to a predetermined potential.

11. A limiter for pulse amplifiers comprising, a source of pulse signals, a gating circuit having a plurality of inputs, an amplifier having an input end and an output end, said gating circuit responsive to said source of pulse signals for passing the lowest amplitude input signal out thereby controlling the input potential at said input end, a reference voltage source, a pulse transformer connected to the output end of said amplifier and to said reference voltage source for producing a differential potential, said pulse transformer including output terminals for supplying a load, a feedback path having at least one diode rectifier having an anode terminal and a cathode and being responsive at said cathode to said differential potential for applying a potential to said gating circuit, said gating circuit operating to vary the input potential at said input end to limit the output at said output terminals to a predetermined potential.

12. Signal responsive apparatus comprising an amplifier, a control circuit having a plurality of inputs, said control circuit being responsive to pass the lowest amplitude input signal to said amplifier, a reference voltage source, and means responsive to an output of said amplifier and said reference voltage source for applying the resultatnt potential to an input of said control circuit when the output of said amplifier exceeds a predetermined potential.

13. Signal responsive apparatus comprising an amplifier, a control circuit having a plurality of inputs, said control circuit being responsive to pass the lowest amplitude input signal to said amplifier, a reference voltage source, and means responsive to an output of said amplifier and said reference voltage source for applying the resultant potential to an input of said control circuit to limit the output when the output of said amplifier exceeds a predetermined potential.

14. Signal responsive apparatus comprising an amplifier, a control circuit having a plurality of inputs, said control circuit being responsive to pass the lowest amplitude input signal to said amplifier, a reference voltage source, and means responsive to an output of said amplifier and said reference voltage source for applying the differential potential to an input of said control circuit to limit the output when the output of said amplifier exceeds a predetermined potential.

15. Signal responsive apparatus comprising an amplifier, a control circuit having a plurality of inputs, said control circuit being responsive to pass the lowest amplitude input signal to said amplifier, a reference voltage source, and feedback means responsive to an output of said amplifier and said reference voltage source for applying the differential potential to an input of said control circuit to limit the output when the output of said amplifier exceeds a predetermined potential.

16. Pulse signal responsive apparatus comprising an amplifier, a control circuit having a plurality of inputs, said control circuit being responsive to pass the lowest amplitude pulse input signal to said amplifier, a reference voltage source, and means including a pulse transformer responsive to an output of said amplifier and said reference voltage source for applying the differential potential to an input of said control circuit to limit the output when the output of said amplifier exceeds a predetermined potential.

References Cited in the file of this patent

UNITED STATES PATENTS

| | | |
|---|---|---|
| 1,863,895 | Bishop | June 21, 1932 |
| 2,144,995 | Pulvari-Pulvermacher | Jan. 24, 1939 |
| 2,214,601 | Andreatta | Sept. 10, 1940 |
| 2,390,503 | Atkins | Dec. 11, 1945 |
| 2,556,200 | Lesti | June 12, 1951 |
| 2,557,729 | Eckert | June 19, 1951 |
| 2,617,036 | Hansen et al. | Nov. 4, 1952 |
| 2,698,914 | Tryon | Jan. 4, 1955 |
| 2,712,065 | Elbourn et al. | June 28, 1955 |

FOREIGN PATENTS

| | | |
|---|---|---|
| 112,270 | Australia | June 29, 1993 |